United States Patent [19]
Furusawa et al.

[11] Patent Number: 4,950,548
[45] Date of Patent: Aug. 21, 1990

[54] MAGNETIC RECORDING MEDIUM AND METHOD OF PRODUCING SAME

[75] Inventors: Kenji Furusawa, Yokohama; Katsuo Abe, Yokosuka; Hiroyuki Kataoka; Tokuho Takagaki, both of Yokohama; Yoshihiro Shiroishi, Hachioji; Norikazu Tsumita, Kanagawa, all of Japan

[73] Assignee: Hitachi, Ltd., Tokyo, Japan

[21] Appl. No.: 355,351

[22] Filed: May 23, 1989

[30] Foreign Application Priority Data

May 27, 1988 [JP] Japan .................... 63-128177

[51] Int. Cl.$^5$ .................... G11B 5/66; G11B 5/84; C23C 14/14; C23C 14/34
[52] U.S. Cl. .................... 428/611; 428/634; 428/636; 428/666; 428/668; 428/678; 428/928; 204/192.2
[58] Field of Search ............... 428/611, 636, 666, 667, 428/660, 661, 678, 679, 668, 634, 928; 204/192.2

[56] References Cited

U.S. PATENT DOCUMENTS

| | | | |
|---|---|---|---|
| 4,371,590 | 2/1983 | Izumi et al. | 428/928 |
| 4,426,265 | 1/1984 | Brunsch et al. | 204/192.15 |
| 4,520,076 | 5/1985 | Saito et al. | 428/928 |
| 4,552,820 | 11/1985 | Lin et al. | 428/611 |
| 4,636,448 | 1/1987 | Morita et al. | 428/611 |
| 4,657,824 | 4/1987 | Howard | 428/611 |
| 4,677,032 | 6/1987 | Robinson | 428/928 |
| 4,722,869 | 2/1988 | Honda et al. | 428/611 |
| 4,786,553 | 11/1988 | Shiroishi et al. | 428/336 |
| 4,792,486 | 12/1988 | Tshizaka et al. | 428/928 |
| 4,795,765 | 1/1989 | Ishizaka et al. | 428/928 |
| 4,880,514 | 11/1989 | Scott et al. | 204/192.2 |

FOREIGN PATENT DOCUMENTS

| | | | |
|---|---|---|---|
| 58-121133 | 7/1983 | Japan | 428/667 |
| 59-185022 | 10/1984 | Japan | 204/192.2 |
| 60-239916 | 11/1985 | Japan | 428/667 |
| 60-247820 | 12/1985 | Japan | 428/667 |
| 61-9821 | 1/1986 | Japan | 428/928 |
| 63-79968 | 4/1988 | Japan | 204/192.2 |

OTHER PUBLICATIONS

Ishikawa, M., "Film Structure and Magnetic Properties of CoNiCr/Cr Sputtered Thin Film", IEEE Transactions on Magnetics, vol. Mag-22, No. 5, Sep. 1988, pp. 573-575.

S. Ohnuma et al., Magnetic Properties of (Fe, Co and Ni)-Zr Amorphous Alloys, IEEE Transactions on Magnetics, vol. Mag-16, No. 5, Sep. 1980, pp. 1129-1131.

S. Uchinami et al., Magnetic Anisotropies in Sputtered Thin Film Disks, IEEE Transactions on Magnetics, vol. Mag-23, No. 5, Sep. 1987, pp. 3408-3410.

*Primary Examiner*—John J. Zimmerman
*Attorney, Agent, or Firm*—Antonelli, Terry, Stout & Kraus

[57] ABSTRACT

The present invention relates to a magnetic recording medium for a magnetic disk unit or the like and, more particularly, to a magnetic recording medium having its recording layer made of a magnetic alloy film with uniform magnetic characteristics. The present magnetic recording medium comprises a non-magnetic substrate, at least two sputtered layers of chromium thin film having a bow-like columnar structure which chromium thin film is laminated on the substrate, another sputtered layer of a magnetic alloy thin film laminated on the chromium thin film, and a protective layer laminated on the magnetic alloy thin film. The present invention is effective in reducing modulation of regenerative output relatively independent of a texture roughness of the substrate.

15 Claims, 4 Drawing Sheets

MAGNETIC RECORDING MEDIUM AND METHOD OF PRODUCING SAME

BACKGROUND OF THE INVENTION

The present invention relates to a magnetic recording medium for a magnetic disk unit or the like and, more particularly, to a magnetic recording medium having its recording layer made of a magnetic alloy film with uniform magnetic characteristics, and a method of producing the medium.

The storage capacity of a magnetic disk as an external storage unit for electronic computers keeps on increasing year by year. Heretofore, a coated medium has been employed as a storage medium of the magnetic disk. The coated medium comprises a substrate made of an aluminum alloy, and a coating applied over the substrate by coating a mixture of $\gamma$-$Fe_2O_3$ needle-like particles and an organic binder. The recording density of that coating type magnetic disk has been increased mainly through a decrease in a film thickness on the medium and development of the magnetic orientation process of fine particles. However, the coated medium is now faced with the limits experienced in an attempt of achieving a larger capacity and a higher recording density drastically.

On the contrary, the development of and practical production of another thin film magnetic recording medium have recently advanced in which a recording layer is made of a magnetic alloy thin film which makes it readily possible to be thinner in thickness, to have a higher coercive force, and to have a higher residual magnetic flux density. One recording medium for a magnetic disk having such a magnetic alloy thin film is known as a metal thin film medium formed by plating, sputtering or vapor deposition. Particularly in these days, metal thin film media made by sputtering using a cobalt nickel alloy or cobalt - chromium alloy have been put into practice primarily in the United States. With a prevailing method of producing the recording medium for the magnetic disk having a magnetic alloy thin film, a chromium thin film, the magnetic alloy thin film and a protective layer are successively formed by sputtering on a non-magnetic substrate while carrying the substrate. However, it is discussed in IEEE Trans. Mag., MAG—22, pp 579–581 (1986) that when a thin film is formed on the substrate while carrying it, the oblique impingement effect of sputtering particles directed toward the substrate brings about magnetic anisotropy in a direction of the movement of the substrate, and a coercive force of the resulting magnetic recording medium exhibits non-uniform distribution in a circumferential direction of the disk, thereby causing modulation of regenerative output. This article also suggests that the modulation of regenerative output, which modulation occurs by forming a film while moving a substrate, can be eliminated by applying a surface working called substrate texturing (i.e., texture working) in a circumferential direction of the substrate face.

Taking into account mass productivity, while the texture working is certainly one effective technique, it is still difficult to fabricate those substrates by texture working which substrates exhibit high reproducibility and which substrates have constant mean and maximum roughness. Further, because the substrate roughness is also limited from the point of flying height of a magnetic head above the magnetic disk surface, the texture roughness of the substrate cannot be determined from a view of improving the modulation of regenerative output alone. A need has therefore been felt for development of a magnetic recording medium which can realize low modulation relatively independent of a texture roughness of a substrate.

SUMMARY OF THE INVENTION

The present invention is intended to solve the aforesaid need. A first object of the present invention is to provide a magnetic recording medium having an improved magnetic alloy thin film as a recording layer, which can realize low modulation relatively independent of a texture roughness of a substrate. A second object of the present invention is to provide a method of producing the magnetic recording medium.

The above first object is achieved by a magnetic recording medium comprising a non-magnetic substrate, at least two sputtered layers of a chromium thin film having a bow-like columnar structure which chromium thin film is laminated on the substrate, another sputtered layer of a magnetic alloy thin film laminated on the chromium thin film, and a protective layer laminated on the magnetic alloy thin film.

FIG. 4 illustrates the cross-sectional structure of a conventional magnetic recording medium comprising a single sputtered layer of a chromium thin film, which structure will be described in detail as a comparative example in the section of embodiments below. On a substrate 41, there are laminated in turn a sputtered layer of a chromium thin film 42, a sputtered layer of a magnetic alloy thin film 43, and a protective layer 44. The sputtered layer of the chromium thin film 42 exhibits a state of crystalline growth that is curved into a bow-like shape. The present invention is featured in making the bow-like sputtered layer of the chromium thin film in the form of a multi-layer structure.

The sputtered layer of the chromium thin film having a bow-like columnar structure in accordance with the present invention takes a laminated layer structure comprising at least two layers, preferably three or more layers. As a practice manner, the sputtered layers of the chromium thin film are preferably 100–500 nm thick in total, each laminated layer being 50–200 nm thick, and the bow-like column preferably has a curvature in a range of 260–200 nm. Thus, assuming that the thickness of one bow-like columnar layer of the chromium thin film is given by t and the curvature of the bow-like structure is given by r based on that structure being approximated to an arcuate shape, the ratio r/t of the curvature r to the thickness t of one column layer is preferably not less than 1.3.

The sputtered layer of the magnetic alloy thin film, which is laminated on the sputtered multilayers of the chromium thin film having a bow-like column structure, is preferably 20–60 nm thick. More preferably, it has a multi-layer structure comprising at least two layers within a range of the above thickness in total.

In order to obtain a proper coercive force Hc, a size of crystal grains making up the magnetic alloy thin film is preferably in a range of 30–70 nm. Hc becomes too large if the grain size is not more than 30 nm, and too small if it is not less than 70 nm.

Furthermore, the composition of a preferred sputtered layer of a magnetic alloy thin film consists of: (1) 20 to 40 atomic % Ni, 0 to 10 atomic % at least one kind selected from the group consisting of Zr, Ti, Ta, and Cr, and the balance Co and incidental impurities; or (2) 5 to 25 atomic % Cr, 0 to 10 atomic % at least one kind selected from the group consisting of Zr, Ti, Ta, Si and Pt, and the balance Co and incidental impurities. It is to be noted that the either composition desirably contains any metal element(s) such as Zr, Ti, Ta, Cr, Si or Pt for imparting a corrosion resistance to the magnetic thin film.

In addition, a protective layer of carbon with a thickness of 30–60 nm, for example, is preferably laminated on the sputtered layer of the magnetic alloy thin film.

Next, the second object of the present invention of producing a magnetic recording medium is achieved by a method of producing a magnetic recording medium, having a step of laminating layers of thin films on a substrate by successively effecting sputtering while carrying the substrate within a sputtering chamber, the method further comprising the steps of: disposing within the sputtering chamber a plurality of chromium targets at a predetermined interval in a direction of the movement of the substrate and disposing within the sputtering chamber a magnetic alloy target at a position downstream of the chromium targets in the substrate movement direction; and at least laminating in turn a plurality of sputtered layers of a chromium thin film, and another sputtered layer of a magnetic alloy thin film on the substrate.

A preferable film thickness of each sputtered layer is the same as that to be satisfied in the magnetic recording medium for achieving the above first object, and can easily be obtained by setting known sputtering conditions for forming a film to predetermined values. A sputtering apparatus may be of any known type usually employed for continuous forming of a multi-layer film, and need not to be special one. However, a particular care must be paid to arrangement of the targets within the sputtering chamber. More specifically, several (preferably not less than three) chromium targets are disposed in the substrate movement direction at a predetermined interval in facing relation to the moving substrate, and the magnetic alloy target (preferably plural targets spaced at a predetermined interval from each other) is disposed at a position downstream of the chromium targets. The sputtered layers having components of the respective targets are laminated in turn on the substrate as it moves successively passing the target surfaces while keeping a facing relation thereto.

The substrate may be any non-magnetic material which is made of a metal such as an aluminum alloy or a non-metal such as glass, heat-resistant resin or ceramics, for example, and which has a rigidity of some degrees. Usually employed as a preferable substrate is an aluminum alloy. In the case of using an aluminum alloy, it is desired to previously plate nickel-phosphorus (Ni-P) on the surface of the substrate and to polish the substrate surface into a flat one. Further, this type substrate is often subjected to a so-called texture working, i.e., working to adjust a surface roughness. But, the texture working is not so important and hence may be omitted in the present invention.

Turning now to the targets used as materials for forming the sputtered layers, the chromium targets can be provided using typical targets commercially available without any trouble. The magnetic alloy target may also be provided using a known commercial one. Essentially, however, the magnetic alloy target preferably has the cobalt-based composition. Typical one is giben by a magnetic alloy comprising a cobalt - nickel or cobalt - chromium alloy. For an improved corrosion resistance, the former cobalt - nickel alloy may further contain at least one metal element such as Zr, Ti, Ta or Cr solely or in combination, and the latter cobalt - chromium alloy may contain at least one metal element such as Zr, Ti, Ta, Si or Pt solely or in combination. The typical compositions consist of: (1) 20 to 40 atomic % Ni, 0 to 10 atomic % at least one kind selected from the group consisting of Zr, Ti, Ta, and Cr, and the balance Co and incidental impurities; and (2) 5 to 25 atomic % Cr, 0 to 10 atomic % at least one kind selected from the group consisting of Zr, Ti, Ta, Si and Pt, and the balance Co and incidental impurities, respectively.

Further, in order to obtain a proper coercive force Hc, it is desired that a crystal grain size in the sputtered layer of the magnetic alloy laminated on the chromium layers is in a range of 30–70 nm. The size of crystal grains is adjusted by the substrate temperature, the gas pressure, and the thickness of the underlying chromium layers. Thus, if the thickness of the chromium layers is within a preferable range of 100–500 nm, the above preferable size of crystal grains can be satisfied in practice.

Finally, turning to the protective layer laminated on the magnetic alloy thin film, the protective layer serves to protect the underlying magnetic alloy thin film from an external atmosphere, in addition to its primary purpose of protecting the recording medium from head crash otherwise caused by a magnetic head upon contact start/stop (CSS) operations. Therefore, the protective layer is required to have good slidability with respect to the magnetic head, and to be sufficiently thin and hard. While a coating film or a sputtered film of resin or the like may be employed, a glass-like carbon thin film or a diamond-like hard carbon layer is recently used as a thin and hard film to cope with recording of a higher density. Preferably, such a hard thin film is employed as the protective layer. The hard thin film can be laminated by conventional film forming means such as sputtering or plasma CVD. When forming the hard thin film by sputtered, it can readily be laminated through a series of continuous sputtering steps by disposing a carbon target at a position downstream of the aforementioned magnetic alloy target. The carbon protection thin film is preferably 30–60 nm thick.

As described later, the inventors have found as a result of the through study that the ratio r/t of the curvature r of the bow-like columnar structure to the thickness of one layer t is increased by rendering the state of the sputtered layers of the chromium thin film underlying the magnetic alloy thin film, to have a laminated bow-like columnar structure. Accordingly, when considering the chromium thin film as a whole, the chromium thin film comprising plural layers of the bow-like columnar structure can be assumed that there occur crystal growth in a direction more approaching a perpendicular axis of the substrate face in comparison with the chromium thin film 42 having a single layer of bow-like columnar structure shown in FIG. 4 as a comparative example. In other words, a magnetic thin film laminated through hetero-epitaxial crystal growth on the chromium thin film having the bow-like columnar structure that is convexed in the substrate movement direction exhibits a magnetic anisotropy in the substrate movement direction; whereas a magnetic thin film successively formed and grown on the chromium thin film, in which there occurs crystal growth in a direction more approaching a perpendicular axis of the substrate face, exhibits a greatly reduced magnetic anisotropy in the substrate movement direction. As a result of further thorough experiment and study concerned with the relationship between the chromium layers laminated under the magnetic thin film and its magnetic anisotropy, the inventors have found that by forming a magnetic thin film and a protective layer in turn on at least two, preferably three or more, layers of a chromium thin film having a bow-like columnar structure so as to produce a thin film magnetic disk, as mentioned above, distribution of a coercive force Hc in the magnetic disk can be made more uniform and low modulation can be realized relatively independent of a texture roughness of the substrate.

DETAILED DESCRIPTION OF THE PREFERRED EMBODIMENTS

Hereinafter, preferred embodiments of the present invention will be described with reference to the drawings. Embodiment 1.

Table 1 shows conditions of film-forming employed for producing a magnetic recording medium which comprises a chromium thin film having three layers of bow-like columnar structure, a magnetic thin film, and a protective layer.

TABLE 1

| | |
|---|---|
| Argon pressure in film-forming | 1.3 Pa |
| Speed of movement of substrate | 3 mm/s |
| Substrate temperature | 220° C. |
| Number of chromium targets | 3 |
| Power applied to each chromium target | 2.9 kW |
| Thickness of chromium thin film | 400 nm |
| Number of Co—Ni alloy targets ($Co_{65}Ni_{30}Zr_5$) | 2 |
| Power applied to each Co-Ni alloy target | 0.7 kW |
| Thickness of magnetic thin film | 50 nm |
| Number of carbon target(s) | 1 |
| Thickness of carbon protective layer | 50 nm |
| Texture average roughness Ra of Ni—P substrate | 4 nm |

Figure 1:
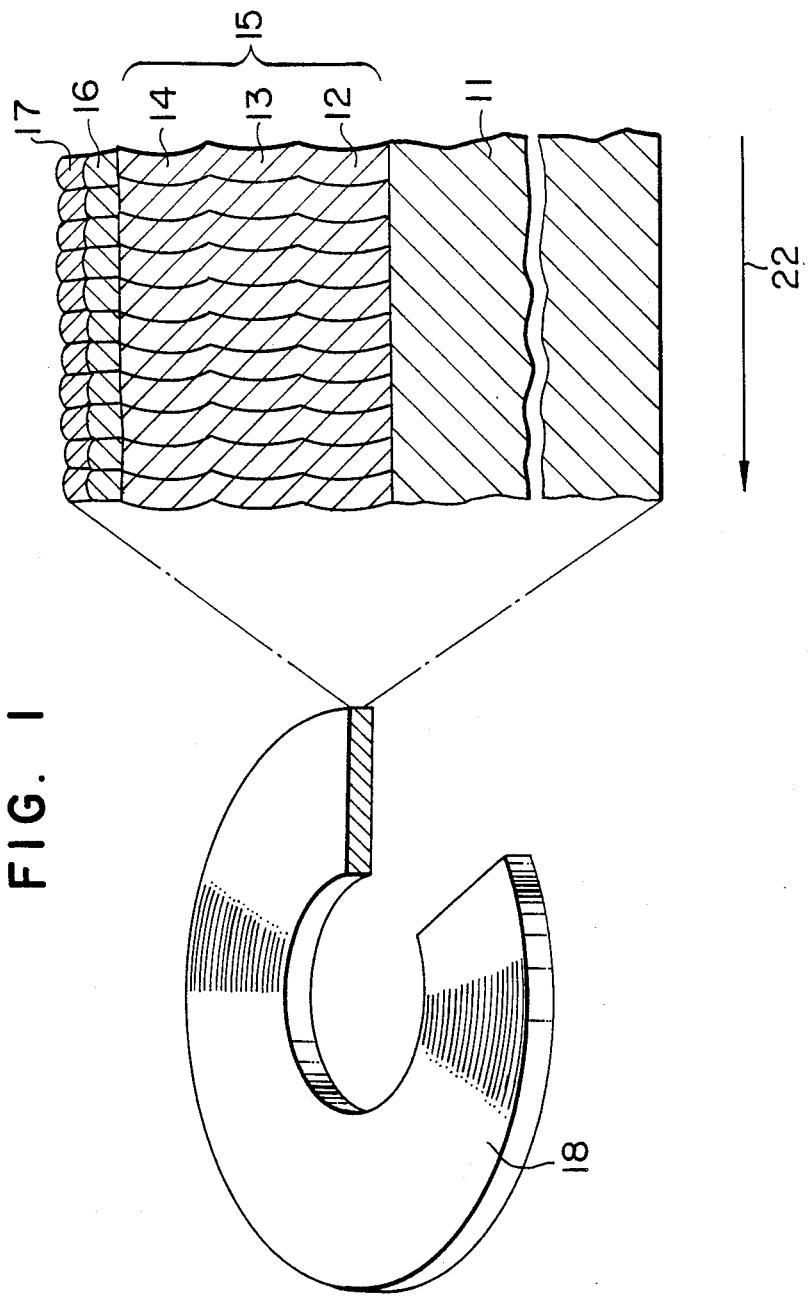
FIG. 1 is an illustrative view for explaining the sectional structure of a magnetic recording medium according to one embodiment of the present invention.

FIG. 1 illustrates a sectional view of a magnetic recording medium produced under the conditions of film-forming shown in Table 1. FIG. 1 was obtained by cutting the magnetic recording medium in a direction parallel to the substrate movement direction indicated by an arrow, and observing the cut surface by a scanning electron microscope. Denoted at 11 is a plated substrate which was fabricated by plating Ni-P on a substrate of an aluminum alloy, polishing the substrate surface, and then applying texture working thereto, 12 is a first chromium layer of bow-like columnar structure that is convexed in the substrate movement direction, 13 is a second chromium layer of bow-like columnar structure, 14 is a third chromium layer of bow-like columnar structure, 15 is a chromium thin film comprising the three layers 12, 13 and 14, 16 is a magnetic thin film, and 17 is a protective layer. Denoted at 22 is an arrow indicating the substrate movement direction in the film-forming. Observation of the cut surface showed that the curvature r of each bow-like columnar layer 12, 13, 14 was about 240 nm, and the thickness t of each bow-like columnar layer was about 130 nm. Accordingly, assuming that one layer of bow-like columnar structure of the chromium thin film has a thickness t and the bow-like structure has the curvature r based on that structure being approximated to an arcuate shape, the ratio r/t becomes about 1.8. As described later in connection with a comparative example, the ratio r/t is about 1 for the chromium thin film comprising one layer of bow-like columnar structure. It can be assumed that with increasing the value of r/t, there occurs crystal growth of the bow-like structure in a direction more approaching the perpendicular axis of the substrate face, resulting in that a magnetic anisotropy of the magnetic recording medium in the substrate movement direction is reduced correspondingly.

Figure 2:
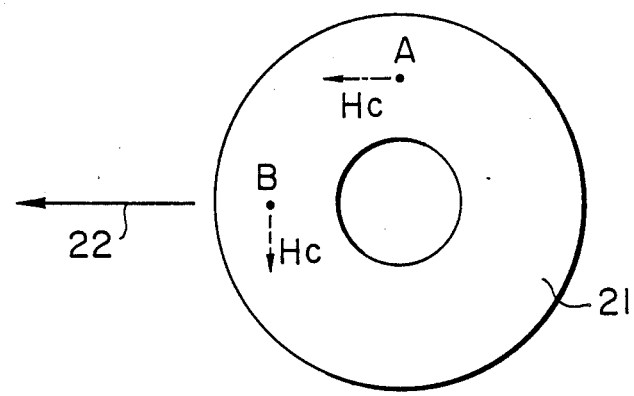
FIG. 2 is an illustrative view showing the positional relationship between points A and B and a direction of the movement in forming the magnetic recording medium.

To prove the above, distribution of a coercive force Hc in the magnetic disk was measured at points A and B as shown in FIG. 2. Table 2 gives the result of the measurement.

TABLE 2

| | Hc measured parallelly to the movement direction | Hc measured vertically to the movement direction |
|---|---|---|
| Point A | 900 Oe | 750 Oe |
| Point B | 745 Oe | 905 Oe |

The coercive force Hc is required to be uniform in a circumferential direction of the magnetic disk. In other words, it is desired that Hc parallel to the substrate movement direction at the point A is equal to Hc vertical to the substrate movement direction at the point B in FIG. 2. Table 2 has proved that by making the chromium thin film composed of three layers of bow-like columnar structure, a magnetic anisotropy of the magnetic disk in the substrate movement direction is reduced, and hence the uniform Hc is imparted to the magnetic disk in its circumferential direction. More specifically, the difference between Hc (900 Oe) parallel to the substrate movement direction at the point A and Hc (905 Oe) vertical to the substrate movement direction at the point B is as small as 5 Oe. The difference between Hc (745 Oe) parallel to the substrate movement direction at the point B and Hc (750 Oe) vertical to the substrate movement direction at the point A is also as small as 5 Oe. While the argon pressure and the substrate temperature are set to 1.3 Pa and 220° C. in this embodiment, respectively, the almost same result was obtained even with the argon pressure and the substrate temperature varying in a range of 0.4–2.7 Pa and 100°–250° C., respectively. Embodiment 2.

Table 3 shows conditions of film forming employed for producing a magnetic recording medium which comprises a chromium thin film having two layers of bow-like columnar structure, a magnetic thin film, and a protective layer.

TABLE 3

| | |
|---|---|
| Number of chromium targets | 2 |
| Power applied to each chromium target | 4.2 kW |
| Number of Co—Ni alloy targets ($Co_{65}Ni_{30}Zr_5$) | 2 |
| Power applied to each Co—Ni alloy target | 0.7 kW |
| Other conditions equal to those in Table 1 | |

Figure 3:
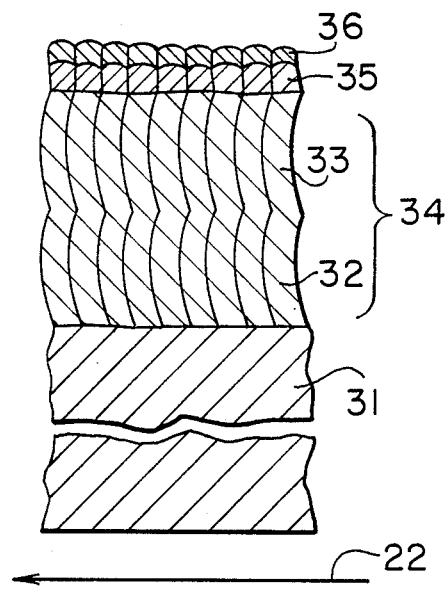
FIG. 3 is an illustrative view for explaining the sectional structure of a magnetic recording medium according to another embodiment of the present invention.

FIG. 3 illustrates a sectional view of a magnetic recording medium produced under the conditions of film forming shown in Table 3. Similarly to the case of FIG. 1, FIG. 3 was obtained by cutting the magnetic recording medium in a direction parallel to the substrate movement direction, and observing the cut surface by a scanning electron microscope. Denoted at 32 is a first chromium layer of bow-like columnar structure that is convexed in the substrate movement direction, 33 is a second chromium layer of bow-like columnar structure, and 34 is a chromium thin film comprising the two layers 32 and 33. Observation of the cut surface showed that the curvature r of each bow-like columnar layer 32, 33 was about 260 nm, and the thickness t of each bow-like columnar layer was about 200 nm. Accordingly, the ratio r/t becomes about 1.3. This value is also larger than r/t=1 for the comparative example. Table 4 gives the result of measuring the distribution of Hc in the magnetic disk at the points A and B as shown in FIG. 2.

TABLE 4

| | Hc measured parallelly to the movement direction | Hc measured vertically to the movement direction |
|---|---|---|
| Point A | 910 Oe | 760 Oe |
| Point B | 800 Oe | 890 Oe |

Table 4 has showed that, by making the chromium thin film composed of two layers of bow-like columnar structure, too, a magnetic anisotropy of the magnetic disk in the substrate movement direction is reduced, and hence the uniform Hc is imparted to the magnetic disk in its circumferential direction.

More specifically, in this embodiment, the difference between Hc (910 Oe) parallel to the substrate movement direction at the point A and Hc (890 Oe) vertical to the substrate movement direction at the point B is relatively small, i.e., 20 Oe. The difference between Hc (800 Oe) parallel to the substrate movement direction at the point B and Hc (760 Oe) vertical to the substrate movement direction at the point A is also relatively small, i.e., 40 Oe. While characteristics of this embodiment is somewhat inferior to those of the above Embodiment 1 comprising three layers, they are still improved significantly as compared with the prior art. Embodiment 3.

A magnetic recording medium was produced under the same conditions as those of Embodiment 1 except that the aluminum alloy substrate was replaced by a glass substrate, and the substrate surface was subjected to texture working to give an average roughness Ra of about 4 nm by a polishing tape working technique. As a consequence, the substantially same result as that of Embodiment 1 was obtained for both the ratio r/t and the distribution of Hc in the magnetic disk. Thus, it has been found that control of a fine state of the chromium thin film is an important factor rather than a material of the substrate for the purpose of imparting uniform Hc to the magnetic disk in its circumferential direction. Embodiment 4.

In a case of a magnetic recording medium whose chromium thin film comprises four laminated layers of bow-like columnar structure, observation of the cut surface of the magnetic recording medium showed that each bow-like columnar structure had the curvature of about 220 nm and the thickness t of about 100 nm. Therefore, the ratio r/t was found to be as high as about 2.2 In a case of the chromium thin film comprising five laminated layers of bow-like columnar structure, r was about 215 nm and r/t about 2.7. Thus, it has been confirmed that by making the chromium thin film composed of four or more laminated layers of bow-like columnar structure, the larger ratio r/t is obtained, and hence a more uniform magnetic anisotropy than that of Embodiment 2 can be imparted to the magnetic disk. However, the more the layers of bow-like columnar structure, the more will be the number of chromium targets required, resulting in a larger size of the film forming apparatus and a higher cost. The using of 3 to 5 laminated layers of bow-like columnar structure is enough to impart uniform Hc to the magnetic disk in its circumferential direction. Embodiment 5.

A magnetic recording medium was produced under the same conditions as those of Embodiment 1 except that the composition of the cobalt - nickel alloy target is replaced by $Co_{55}Ni_{40}Zr_5$. As a consequence, the substantially same result as that of Embodiment 1 was obtained for the ratio r/t; whereas the result of a coercive force Hc higher about 200 Oe than that of Embodiment 1 was obtained as shown in Table 5.

TABLE 5

| | Hc measured parallelly to the movement direction | Hc measured vertically to the movement direction |
|---|---|---|
| Point A | 1,100 Oe | 960 Oe |
| Point B | 965 Oe | 1,090 Oe |

The value of r/t is essentially determined by a sectional configuration of the chromium thin film, and not dependent on the composition of the cobalt - nickel alloy. It has been found from Table 5 that Hc parallel to the substrate movement direction at the point A is substantially equal to Hc vertical to the substrate movement direction at the point B, i.e., that a uniform coercive force Hc is obtained in a circumferential direction of the magnetic disk. This is because of a decreased magnetic anisotropy in the substrate movement direction as resulted from making the chromium thin film be composed of three layers of bow-like columnar structure. On the other hand, the increase of Hc by about 200 Oe is attributable to change in the composition of the cobalt - nickel alloy. As stated in the section of Background of the Invention, a higher coercive force of the recording medium is required to achieve a higher recording density of the magnetic disk. The composition of the cobalt - nickel alloy disclosed in this embodiment can be regarded as one suitable for the magnetic alloy composition to achieve a higher recording density in future, because the magnetic disk of high recording density can be obtained with that composition. It has been found from Embodiments 1 and 5 that multi-layers of the chromium thin film is merely required to impart a uniform coercive force Hc to the magnetic disk in its circumferential direction, and change in the composition of the cobalt - nickel magnetic alloy is merely required to control the coercive force Hc itself. Accordingly, it will be seen that the object of the present invention to uniformalize magnetic characteristics of the magnetic recording medium is essentially related to a structure of the chromium thin film, and the composition of the magnetic thin film may be given by either a cobalt - nickel - X alloy (X=Zr, Ti, Ta, Cr) or a cobalt - chromium - X alloy (X=Zr, Ti, Ta, Si, Pt) for imparting a corrosion resistance as stated in the section of Summary of the Invention. Thus, the optimum magnetic alloy composition can be selected when determining a coercive force Hc and a residual magnetic flux density from the standpoint of magnetic characteristics. Comparative Example 1

A comparative example with respect to the foregoing embodiments will be described below.

Table 6 shows conditions of film-forming employed for producing a magnetic recording medium which comprises a chromium thin film having one layer of bow-like columnar structure, a magnetic thin film, and a protective layer.

TABLE 6

| | |
|---|---|
| Speed of movement of substrate | 1.3 mm/s |
| Substrate temperature | 220° C. |
| Number of chromium target(s) | 1 |
| Power applied to each chromium target | 4.2 kW |
| Thickness of chromium thin film | 400 nm |
| Number of Co-Ni alloy target(s) | 1 |
| Power applied to each Co-Ni alloy target | 0.7 kW |
| Thickness of magnetic thin film | 50 nm |
| Other conditions equal to those in Table 1 | |

Figure 4:
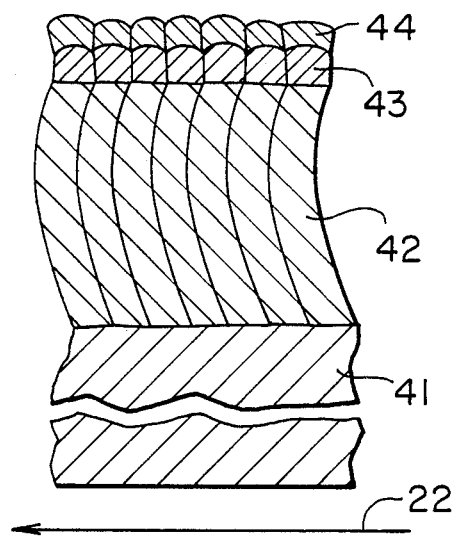
FIG. 4 is an illustrative view for explaining the sectional structure of a magnetic recording medium as an comparative example.

FIG. 4 illustrates a sectional view of a magnetic recording medium produced under the conditions of film forming shown in Table 6. Similarly to the case of FIG. 1, FIG. 4 was obtained by cutting the magnetic recording medium in a direction parallel to the substrate movement direction indicated, and observing the cut surface by a scanning electron microscope. Denoted at 42 is a chromium thin film of bow-like columnar structure that is convexed in the substrate movement direction. Observation of the cut surface showed that the curvature r of the bow-like columnar layer 42 was about 400 nm, and the thickness t of the bow-like columnar layer, i.e., the chromium thin film, was about 400 nm. Accordingly, the ratio r/t is about 1.3. Table 7 gives the result of measuring the distribution of Hc in the magnetic disk at the points A and B as shown in FIG. 2.

TABLE 7

| | Hc measured parallelly to the movement direction | HC measured vertically to the movement direction |
|---|---|---|
| Point A | 890 Oe | 780 Oe |
| Point B | 900 Oe | 800 Oe |

As mentioned above, the coercive force Hc is desired to be uniform in a circumferential direction of the magnetic disk. In other words, Hc parallel to the substrate movement direction at the point A should be equal to Hc vertical to the substrate movement direction at the point B in Table 7. With the magnetic disk having the sectional structure as shown in FIG. 4, however, there occurs non-uniform distribution of Hc in the circumferential direction as will be seen from Table 7. More specifically, the difference between Hc (890 Oe) parallel to the substrate movement direction at the point A and Hc (800 Oe) vertical to the substrate movement direction at the point B is as large as 90 Oe. The difference between Hc (900 Oe) parallel to the substrate movement direction at the point B and Hc (780 Oe) vertical to the substrate movement direction at the point A is also as large as 120 Oe. Thus, Table 7 indicates that the prior magnetic recording medium exhibits a large magnetic anisotropy in the substrate movement direction.

Figure 5:
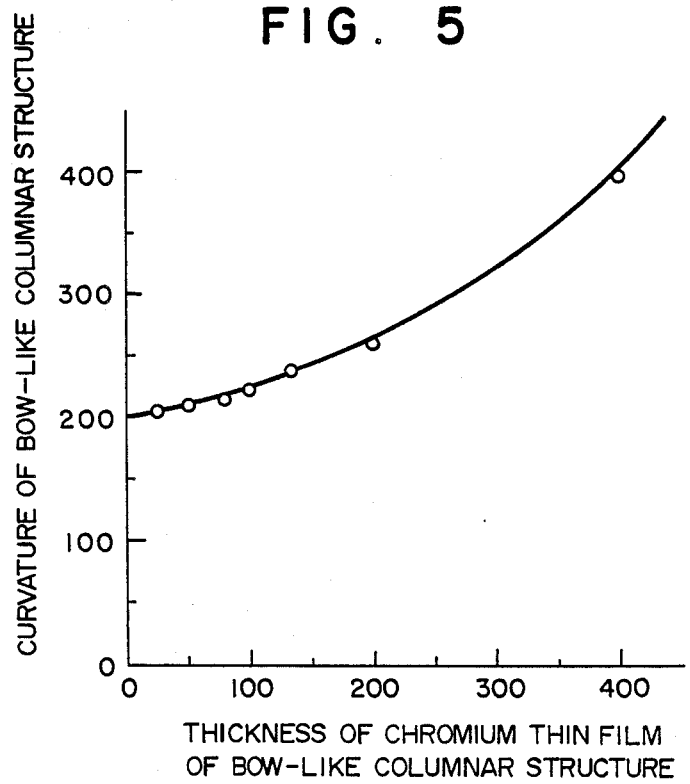
FIG. 5 is a characteristic graph showing the relationship between the thickness t of a chromium thin film comprising one layer of a bow-like columnar structure and the curvature r thereof.

FIG. 5 shows the relationship between the thickness t of one layer of bow-like columnar structure and the radius of curvature r thereof, with a thickness of the chromium thin film held constant at 400 nm. It has been found from FIG. 5 that, although the thickness t of one layer of bow-like columnar structure is made smaller, the curvature r of the bow-like columnar structure is not reduced so drastically and instead converges to a certain value. In other words, FIG. 5 teaches that, as the thickness t of one layer of bow-like columnar structure is decreased, the columnar structure more approaches from a bow shape toward a pillar shape, and a fine form or state of the chromium thin film is less affected by the film-forming process while carrying a substrate.

Embodiment 6.

This embodiment is directed to prove that the present invention is also effective in stabilizing magnetic characteristics of a perpendicular magnetic recording medium. Such a perpendicular magnetic recording medium was produced under conditions as shown in Table 8 using a Co-Cr target and a Permalloy target.

TABLE 8

| | |
|---|---|
| Argon pressure in film-forming | 1.3 Pa |
| Speed of movement of substrate | 3 mm/s |
| Substrate temperature | 220° C. |
| Number of Permalloy targets | 3 |
| Power applied to each Permalloy target | 2.9 kW |
| Thickness of Permalloy thin film | 400 nm |
| Number of Co—Cr targets | 3 |
| Power applied to each Co—Cr target | 2.8 kW |
| Thickness of perpendicular magnetization magnetic thin film | 300 nm |
| Number of carbon target(s) | 1 |
| Thickness of carbon protection thin film | 30 nm |
| Plane average roughness Ra of Ni/P substrate | 2 nm |

Figure 6:
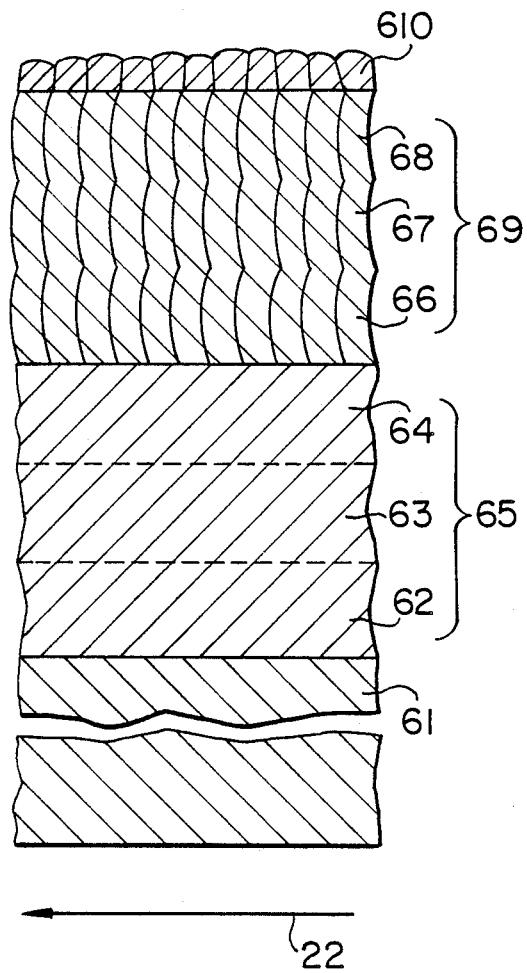
FIG. 6 is an illustrative view for explaining the sectional structure of a magnetic recording medium according to still another embodiment of the present invention.

FIG. 6 illustrates a sectional view of a perpendicular magnetic recording medium which was produced under the conditions of film-forming shown in Table 8. Similarly to the case of Embodiment 1, FIG. 6 was obtained by cutting the perpendicular recording medium of in a direction parallel to the substrate movement direction indicated by an arrow, and observing the cut surface by a scanning electron microscope. Denoted at 61 is a plated substrate which was fabricated by plating Ni-P on a substrate of an aluminum alloy and then polishing the substrate into a mirror surface, 62 is a first Permalloy layer, 63 is a second Permalloy layer, 64 is a third Permalloy layer, 65 is a Permalloy thin film comprising the three layers 62, 63 and 64, 66 is a first perpendicular magnetic recording layer of bow-like columnar structure, 67 is a second perpendicular magnetic recording layer of bow-like columnar structure, 68 is a third perpendicular magnetic recording layer of bow-like columnar structure, 69 is a perpendicular magnetic recording thin film comprising the three layers 66, 67 and 68, and 610 is a protective layer. Observation of the cut surface showed that the curvature r of each bow-like column layer 12, 13, 14 was about 220 nm, and the thickness t of each bow-like column structure was about 100 nm. Accordingly, the ratio r/t of the cobalt - chromium perpendicular magnetic recording thin film was about 2.2. As described above, with increasing the value of r/t, there occurs crystal growth of the bow-like structure in a direction more approaching the perpendicular axis of the substrate face, resulting in that the perpendicular magnetic recording medium is also reduced correspondingly in its magnetic anisotropy in the substrate movement direction.

Table 9 gives the result of measuring distribution of a coercive force Hc in the magnetic disk at the points A and B as shown in FIG. 2.

TABLE 9

|  | Hc measured perpendicularly to disk face | Hc measured parallelly to the movement direction | Hc measured vertically to the movement direction |
| --- | --- | --- | --- |
| Point A | 950 Oe | 455 Oe | 450 Oe |
| Point B | 955 Oe | 450 Oe | 445 Oe |

It will be seen from Table 9 that the coercive force Hc in a direction normal to disk face, Hc parallel to the substrate movement direction in the disk face, and Hc vertical to the substrate movement direction in the disk face are nearly equal at the points A and B for each direction. The argon pressure and the substrate temperature were set to 1.3 Pa and 220° C. in this embodiment, respectively, however, the almost same result was obtained for uniformity of Hc even with the argon pressure and the substrate temperature varying in a range of 0.4–2.7 Pa and 120°–250° C., respectively, though an absolute value of Hc is varied.

Further, as will be seen from this embodiment, what is effective in producing essentially uniform Hc is to provide the multi-layered bow-like columnar structure of a cobalt - nickel perpendicular magnetization magnetic recording thin film. This effect is scarcely dependent on the kind of a high magnetic permeability material, because similar results had been obtained also using an amorphous material such as a cobalt - molybdenum - zirconium alloy or a cobalt - niobium - zirconium alloy, other than Permalloy, as a high magnetic permeability magnetic thin film. In addition, a similar result was obtained in a case of mixing about 0.3–4 atomic % a third additive, such as Ta, Nb, Zr or Ni, with the cobalt - chromium alloy for an improvement in corrosion resistance and a perpendicular magnetic anisotropy, as well. Embodiment 7.

Table 10 shows conditions of film-forming employed for producing a perpendicular magnetic recording medium which comprises two layers of a Permalloy thin film and two layers of a cobalt - chromium perpendicular magnetic recording thin film of bow-like columnar structure, using two Permalloy and two Co-Cr targets.

TABLE 10

| Number of Permalloy targets | 2 |
| --- | --- |
| Power applied to each Permalloy target | 4.3 kW |
| Number of Co—Cr targets | 2 |
| Power applied to each Co—Cr target | 4.1 KW |
| Other conditions equal to those in Table 8 | |

Measuring a coercive force Hc has brought about the almost same result as that shown in Table 9. The measured result is shown in Table 11.

TABLE 11

|  | Hc measured perpendicularly to disk face | Hc measured parallelly to the movement direction | Hc measured vertically to the movement direction |
| --- | --- | --- | --- |
| Point A | 930 Oe | 480 Oe | 460 Oe |
| Point B | 940 Oe | 490 Oe | 460 Oe |

It has been found from Table 11 that the coercive forces Hc normal to the disk face are substantially uniform at the points A and B with the difference as small as 10 Oe, whereas in the disk face, there occur magnetic anisotropy of 20 Oe and 30 Oe at the points A, B between two directions parallel and vertical to the disk movement direction, respectively. As a whole, a nearly uniform anisotropy of perpendicular magnetization is obtained at both the points A and B. Magnetic characteristics are improved significantly as compared with the prior art (see Comparative Example 2), though the uniformity is somewhat inferior to that obtainable by the perpendicular magnetic recording medium of the above Embodiment 6, which medium has three layers of bow-like columnar structure. Comparative Example 2

A comparative example with respect to Embodiments 6 and 7 will be described below. Table 12 shows conditions of film-forming employed for producing a perpendicular magnetic recording medium which comprises one layer of a Permalloy thin film and one layer of a cobalt - chromium perpendicular magnetic recording thin film of bow-like columnar structure, and a protective layer.

TABLE 12

| Speed of movement of substrate | 1.5 mm/s |
| --- | --- |
| Substrate temperature | 220° C. |
| Number of Permalloy target(s) | 1 |
| Power applied to each Permalloy target | 4.3 kW |
| Thickness of Permalloy thin film | 400 nm |
| Number of Co—Cr target(s) | 1 |
| Power applied to each Co—Cr target | 4.1 kW |
| Thickness of perpendicular magnetic recording thin film | 300 nm |
| Other conditions equal to those in Table 8 | |

Figure 7:
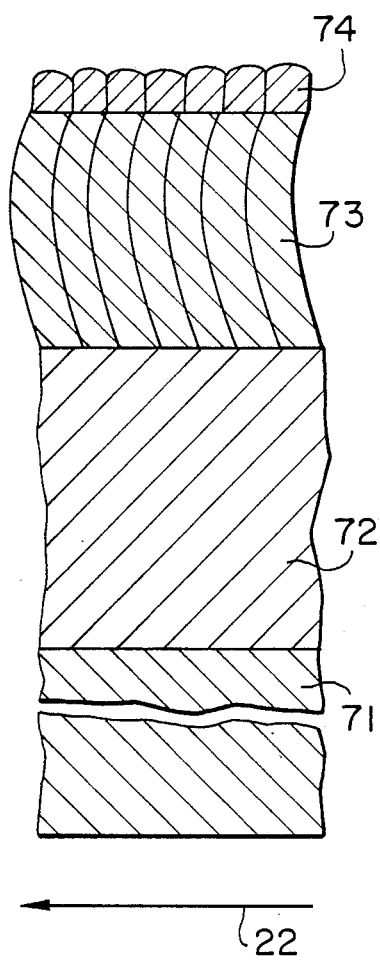
FIG. 7 is an illustrative view for explaining the sectional structure of a magnetic recording medium as a comparative example.

FIG. 7 illustrates a sectional view of the perpendicular recording medium which was produced under the conditions of film-forming shown in Table 12. Denoted at 72 is a Permalloy thin film comprising one layer, and 73 is a cobalt - chromium perpendicular magnetic recording thin film comprising one layer of bow-like columnar structure that is convexed in the substrate movement direction. The bow-like columnar layer 73 has the curvature r of about 320 nm and the thickness t of about 300 nm, resulting in the ratio r/t of about 1.1. Table 13 gives the result of measuring distribution of a coercive force Hc in the magnetic disk at the points A and B as shown in FIG. 2.

TABLE 13

|  | Hc measured perpendicularly to disk face | Hc measured parallelly to the movement direction | Hc measured vertically to the movement direction |
| --- | --- | --- | --- |
| Point A | 900 Oe | 600 Oe | 490 Oe |
| Point B | 930 Oe | 580 Oe | 500 Oe |

It has been found that Hc normal to the disk face is reduced, whereas Hc in the disk face parallel to the disk movement direction is increased, as compared with the foregoing embodiments. This means that a perpendicular magnetic anisotropy of the cobalt - chromium perpendicular magnetic recording thin film is reduced, and a magnetic anisotropy in the disk face in the disk movement direction is increased. Stated differently, if the cobalt - chromium perpendicular magnetic recording thin film is made of one layer of bow-like column structure, it will lose specific characteristics of a perpendicular magnetic recording thin film.

According to the present invention, the laminated bow-like columnar structure of the chromium thin film is essentially effective in reducing a magnetic anisotropy of the magnetic recording medium in the substrate movement direction, and imparting a uniform coercive force Hc to the magnetic disk in its circumferential direction. Consequently, it becomes possible to provide a thin film magnetic disk in which modulation can be reduced relatively independent of a texture roughness of the substrate.

What is claimed is:

1. A magnetic recording medium comprising a non-magnetic substrate, at least two sputtered layers of a chromium thin film having a bow-like columnar structure which chromium thin film is laminated on the substrate, another sputtered layer of a magnetic alloy thin film laminated on the chromium thin film, and a protective layer laminated on the magnetic alloy thin film.

2. A magnetic recording medium as claimed in claim 1, wherein the sputtered layer of the magnetic alloy thin film has a laminated layer structure comprising at least two layers.

3. A magnetic recording medium as claimed in claim 1, wherein the sputtered layers of the chromium thin film are 100 to 500 nm thick, each layer being 50 to 200 nm thick and having curvature not larger than 260 nm, and the sputtered layer of the magnetic alloy thin film is 20 to 60 nm thick.

4. A magnetic recording medium as claimed in claim 1, wherein the composition of the sputtered layer of the magnetic alloy thin film consists of 20 to 40 atomic % Ni, 0 to 10 atomic % at least one kind selected from the group consisting of Zr, Ti, Ta, and Cr, and the balance Co and incidental impurities.

5. A magnetic recording medium as claimed in claim 1, wherein the composition of the sputtered layer of the magnetic alloy thin film consists of 5 to 25 atomic % Cr, 0 to 10 atomic % at least one kind selected from the group consisting of Zr, Ti, Ta, Si and Pt, and the balance Co and incidental impurities.

6. A magnetic recording medium as claimed in claim 1, wherein a size of crystal grains constituting the sputtered layer of the magnetic alloy thin film is in a range of 30 to 70 nm.

7. A magnetic recording medium as claimed in claim 1, wherein a protective layer of carbon is laminated on the sputtered layer of the magnetic alloy thin film.

8. A perpendicular magnetic recording medium, comprising a non-magnetic substrate, at least two sputtered layers of a high magnetic permeability magnetic thin film of bow-like columnar structure which thin film is laminated on the substrate, another sputtered layer of perpendicular magnetic recording thin film laminated on the high permeability magnetic thin film, and a protective thin film laminated on the perpendicular magnetic recording thin film.

9. A perpendicular magnetic recording medium as claimed in claim 8, wherein the sputtered layer of the perpendicular magnetic recording thin film comprises a laminated layer film having at least two layers of bow-like columnar structure.

10. A perpendicular magnetic recording medium as claimed in claim 9, wherein the sputtered layers of the high magnetic permeability magnetic thin film are 100 to 500 nm thick, each layer being 50 to 200 nm thick and having the curvature not larger than 260 nm, and the sputtered layers of the perpendicular magnetic recording thin film having bow-like columnar structure are 100 to 500 nm thick, each layer being 50 to 250 nm thick and having the curvature not larger than 260 nm.

11. A perpendicular magnetic recording medium as claimed in claim 8, wherein the composition of the sputtered layers of the high permeability magnetic thin film consists of an alloy comprising nickel and iron, or a cobalt - molybdenum - zirconium alloy, or a cobalt - niobium - zirconium alloy.

12. A perpendicular magnetic recording medium as claimed in claim 8, wherein the composition of the sputtered layer of the perpendicular magnetization magnetic thin film consists of 5 to 25 atomic % Cr, 0.3 to 4 atomic % at least one kind selected from the group consisting of Ta, Nb, Zr, and Ni, and the balance Co and incidental impurities.

13. A perpendicular magnetic recording medium as claimed in claim 8, wherein a protective layer of carbon is laminated on the sputtered layer of the perpendicular magnetic recording thin film.

14. In a method of producing a magnetic recording medium, having a step of laminating layers of thin films on a substrate by successively effecting sputtering while carrying the substrate within a sputtering chamber, the improvement further comprising the steps of:
  disposing within the sputtering chamber a plurality of chromium targets at a predetermined interval in a direction of the movement of the substrate and disposing within the sputtering chamber a magnetic alloy target at a position downstream of the chromium targets in the substrate movement direction; and
  at least laminating in turn a plurality of sputtered layers of a chromium thin film, and another sputtered layer of a magnetic alloy thin film on the substrate.

15. A method of producing a perpendicular magnetic recording medium comprising a perpendicular magnetic recording medium, comprising a non-magnetic substrate, at least two sputtered layers of a high magnetic permeability magnetic thin film of bow-like columnar structure which thin film is laminated on the substrate, another sputtered layer of perpendicular magnetic recording thin film laminated on the perpendicular magnetic recording thin film, said method having a step of laminating layers of thin films on a substrate by successively effecting sputtering while carrying the substrate within a sputtering chamber, the improvement further comprising the steps of:
  disposing within the sputtering chamber a plurality of high permeability magnetic targets at a predetermined interval in a direction of the movement of the substrate and disposing within the sputtering chamber a perpendicular magnetic recording alloy target at a position downstream of the high permeability magnetic targets in the substrate movement direction; and
  at least laminating in turn a plurality of sputtered layers of a high permeability magnetic thin film, and another sputtered layer of a perpendicular magnetic recording thin film on the substrate.

* * * * *